United States Patent [19]

Umeda et al.

[11] Patent Number: 5,449,710
[45] Date of Patent: Sep. 12, 1995

[54] FLAME RETARDATIVE POLYCARBONATE RESIN COMPOSITION

[75] Inventors: Takashi Umeda; Akio Nodera; Kazuto Hashimoto, all of Ichihara, Japan

[73] Assignee: Idemitsu Petrochemical Co., Ltd., Tokyo, Japan

[21] Appl. No.: 239,134

[22] Filed: May 6, 1994

[30] Foreign Application Priority Data

May 18, 1993 [JP] Japan ................... 5-116106
May 28, 1993 [JP] Japan ................... 5-126787

[51] Int. Cl.⁶ .................... C08K 5/54; C08K 5/42
[52] U.S. Cl. .................... 524/165; 524/265; 524/405; 524/413; 524/432; 524/493; 524/494; 524/495; 528/31
[58] Field of Search .......... 524/265, 165, 405, 413, 524/432, 493, 494, 495; 528/31

[56] References Cited

U.S. PATENT DOCUMENTS

| | | | |
|---|---|---|---|
| 3,845,007 | 10/1974 | Nouverné et al. | 524/165 |
| 3,971,756 | 7/1976 | Bialous et al. | |
| 4,463,374 | 5/1987 | Sonoda. | |
| 4,916,194 | 4/1990 | Policastro et al. | 525/474 |
| 4,954,549 | 9/1990 | Lewis et al. | 524/265 |
| 5,153,251 | 10/1992 | Lupinski et al. | 524/265 |
| 5,239,034 | 8/1993 | Takago et al. | 528/31 |
| 5,244,733 | 9/1993 | Kozakai et al. | 528/31 |
| 5,262,506 | 11/1993 | Okawa et al. | 528/31 |
| 5,266,618 | 11/1993 | Watanabe et al. | 524/265 |

FOREIGN PATENT DOCUMENTS

| | | |
|---|---|---|
| 0483628 | 5/1992 | European Pat. Off. |
| 0595187 | 5/1994 | European Pat. Off. |
| 2282450 | 3/1976 | France. |
| 3500807 | 7/1985 | Germany. |
| 2019422 | 10/1979 | United Kingdom. |
| WO80/00084 | 1/1980 | WIPO. |
| WO90/13590 | 11/1990 | WIPO. |

Primary Examiner—Veronica P. Hoke
Attorney, Agent, or Firm—Oblon, Spivak, McClelland, Maier, & Neustadt

[57] ABSTRACT

There is disclosed a flame retardative polycarbonate resin composition which comprises 100 parts by weight of an aromatic polycarbonate resin (A), 0.01 to 0.5 part by weight of an alkali/or alkaline-earth metal salt of a perfluoroalkanesulfonic acid (B), 0.03 to 5 parts by weight of an organopolysiloxane containing organoxysilyl group bonded to a silicon atom through a divalent hydrocarbon group (C), and optionally 5 to 120 parts by weight of an inorganic filler. The above composition has excellent flame retardancy capable of preventing dripping thereof at the time of combustion of a thin-walled material made from the highly fluidized composition while maintaining the dimensional stability and the mechanical properties such as impact resistance that are inherent in polycarbonate.

12 Claims, No Drawings

FLAME RETARDATIVE POLYCARBONATE RESIN COMPOSITION

BACKGROUND OF THE INVENTION

1. Field of the Invention

The present invention relates to a novel flame retardative polycarbonate resin composition. More particularly, it pertains to a polycarbonate resin composition excellent in flame retardancy and capable of preventing dripping thereof at the time of combustion of a thin-walled material made from the composition highly fluidized while precluding the deterioration of the mechanical properties such as impact resistance as well as dimensional stability that are inherent in polycarbonate.

2. Description of Related Arts

A polycarbonate resin is excellent in mechanical strength, particularly impact strength, electrical properties, transparency and the like and is widely utilized in a variety of fields of office automation machinery, electric and electronic machinery, automobiles, architecture and the like. Some of the above-mentioned utilization fields typified by the fields of office automation machinery and electric and electronic machinery are required to have high flame retardancy.

Of various thermoplastic resins, polycarbonate has a high oxygen index and in general, a self-fire-extinguishing property. However, in order to meet the requirement on the safety in various application fields of office automation machinery, electric and electronic machinery and the like, there is strongly required the development of a resin composition which is further enhanced not only in flame retardancy but also in fluidity in view of the demand directed to thin-walled material.

A polycarbonate resin has heretofore been imparted with flame retardancy usually by being incorporated with a flame retardant and a flame retardant aid. The most prevailing flame retardant used for a polycarbonate is a bromine-based flame retardant.

However, the polycarbonate resin composition incorporated with such a bromine-based flame retardant involues the environmental problem that a gas generated at the time of combustion, for example, a gas generated at the time of combustion of the composition incorporated with decabromodiphenyl ether or the like causes a fear of containing dioxin which has been one of the most serious problems in recent years due to the influence on human bodies.

Such being the case, investigation on a nonbromine-based flame retardant is in progress for the sake of flame retardation of a polycarbonate resin. For example, Japanese Patent Publication No. 40445/1972 discloses a polycarbonate resin composition which is incorporated with an alkali metal salt or an alkaline earth metal salt of a perfluoroalkanesulfonic acid, but the technique disclosed therein suffers the disadvantage of causing dripping of the resin composition at the time combustion and thereby igniting the material immediately below it. Japanese Patent Publication No. 38419/1985 discloses a technique of preventing dripping of a polycarbonate resin at the time of combustion thereof by incorporating therein an alkali metal salt or an alkaline earth metal salt of a perfluoroalkanesulfonic acid and further adding a siloxane to the mixture. Nevertheless, the above-disclosed technique still suffers the drawback of causing dripping of the resin at the time of combustion and thereby igniting the material immediately below the resin in the case where the resin is highly fluized. In addition, Japanese Patent Publication No. 16473/1985 discloses a technique of preventing dripping of a polycarbonate resin at the time of combustion thereof by adding thereto an alkali metal salt of a perfluoroalkanesulfonic acid and a glass fiber, but the technique disclosed therein is not necessarily satisfactory.

SUMMARY OF THE INVENTION

It is a general object of the present invention to provide a polycarbonate resin composition excellent in flame retardancy and capable of preventing dripping thereof at the time of combustion of a thin-walled material made from the highly fluidized composition by imparting flame retardancy thereto with a nonbromine-based flame retardant, while precluding the deterioration of the mechanical properties such as impact resistance as well as dimensional stability that are inherent in polycarbonate.

In this connection, intensive research and investigation were accumulated by the present inventors in order to develop a polycarbonate resin composition having favorable properties as mentioned above. As a result, it has been found that the aforestated object can be attained by blending an aromatic polycarbonate resin with an alkali metal salt or an alkaline earth metal salt of a perfluoroalkanesulfonic acid, a specific organopolysiloxane and, as the case may be, an inorganic filler each in a prescribed proportion. The present invention has been accomplished on the basis of the above-mentioned finding and information thus obtained.

Specifically, the present invention provides a flame retardative polycarbonate resin composition (I) which comprises 100 parts by weight of an aromatic polycarbonate resin (A), 0.01 to 0.5 part by weight of at least one metal salt selected from the group consisting of an alkali metal salt of a perfluoroalkanesalfonic acid and an alkaline earth metal salt of a perfluoroalkanesulfonic acid (B), and 0.03 to 5 parts by weight of an organopolysiloxane containing organoxysilyl group bonded to a silicon atom through a divalent hydrocarbon radical (C), said metal salt and said organopolysiloxane being compounded into said polycarbonate resin, and at the same time, a flame retardative polycarbonate resin composition (II) which comprises 100 parts by weight of an aromatic polycarbonate resin (A), 0.01 to 0.5 part by weight of at least one metal salt selected from the group consisting of an alkali metal salt of a perfluoroalkanesulfonic acid and an alkaline earth metal salt of a perfluoroalkanesulfonic acid (B), 0.03 to 5 parts by weight of an organopolysiloxane containing organoxysilyl group bonded to a silicon atom through a divalent hydrocarbon radical (C), and 5 to 120 parts by weight of an inorganic filler (D) said metal salt, said organopolysiloxane and said filler being compounded into said polycarbonate resin.

DESCRIPTION OF PREFERRED EMBODIMENT

The polycarbonate resin composition [I] according to the present invention comprises an aromatic polycarbonate resin (A), an alkali metal salt or an alkaline earth metal salt of a perf luoroalkanesulfonic acid (B), and an organopolysiloxane containing organoxysilyl group bonded to a silicon atom through a divalent hydrocarbon radical (C), and the polycarbonate resin composition [II] further comprises an inorganic filler in addition to the above-mentioned components (A), (B) and (C).

There are available a variety of aromatic polycarbonate resins as the component (A), of which is preferable a polymer having the structural unit represented by the general formula (I)

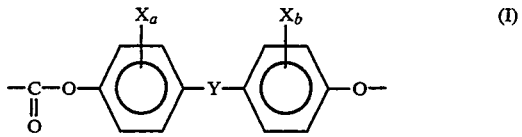

wherein X is a hydrogen atom, halogen atom such as a chlorine atom, a bromine atom, a fluorine atom and an iodine atom, or an alkyl group having 1 to 8 carbon atoms such as methyl group, ethyl group, propyl group, n-butyl group, isobutyl group, amyl group, isoamyl group or hexyl group, and when a plurality of X are contained, X may be the same or different from each other; a and b are, respectively, an integer of 0 to 4; and Y is a single bond, an alkylene group having 1 to 8 carbon atoms such as methylene group, ethylene group, propylene group, butylene group, pentelylene group and hexylene group, an alkylidene group having 2 to 8 carbon atoms such as ethylidene group and isopropylidene group, a cycloalkylene group having 5 to 15 carbon atoms such as cyclopentylene group and cyclohexylene group, a cycloalkylidene group having 5 to 15 carbon atoms, such as cyclopentylidene group and cyclohexylidene group, —S—, —SO—, —SO$_2$—, —O—, —CO— or a bond represented by the general formula (II) or (II'):

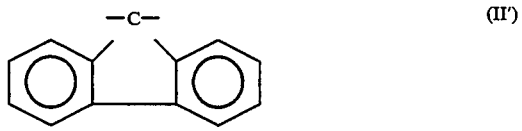

The aromatic polycarbonate resin described above can be prepared easily by the reaction of a dihydric phenol represented by the general formula (III):

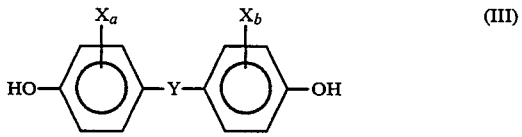

wherein X, a, b and Y are the same as described above, with phosgen or a carbonic acid diester compound.

For example, the aromatic polycarbonate resin can be prepared by the reaction of a dihydric phenol with a carbonate precurso, such as phosgen in a solvent such as methylene chloride in the presencer of a publicly known acid acceptor or a publicly known molecular weight modifiner, or by transesterification between a dihydric phenol and a Carbonate precursor such as diphenyl carbonate.

There are available various dihydric phenols as represented by the general formula (III) described above. Particularly 2,2-bis(4-hydroxyphenyl) propane [usually called bisphenol A] is preferable as a dihydric phenol. As a bisphenol other than bisphenol A, mention is made of a dihydroxydiarylalkane such as bis(4-hydroxyphenol)-methane; bis(4-hydroxyphenyl)phenylmethane; bis(4-hydroxyphenyl)naphthylmethane; bis(4-hydroxyphenyl)-(4-isopropylphenyl)methane; bis(3,5-dichloro-4-hydroxy-phenyl)mehane; bis(3,5-dimethyl-4-hydroxyphenyl)methane; 1,1-bis(4-hydroxyphenyl)ethane; 1-naphthyl-1, 1-bis(4-hydroxyphenol)ethane; 1-phenyl-1, 1-bis(4-hydroxyphenyl)ethane; 1, 2-bis(4-hydroxyphenyl)ethane; 2-methyl-1, 1-bis(4-hydroxyphenyl)propane; 2, 2-bis(3, 5-dimethyl-4-hydroxy-phenyl)propane; 1-ethyl-1, 1-bis(4-hydroxyphenyl)propane; 2, 2-bis(3, 5-dichloro-4-hydroxyphenyl)propane; 2, 2-bis(3, 5-dibromo-4-hydroxyphenyl)propane; 2, 2-bis(3-chloro-4-hydroxyphenyl)propane; 2, 2-bis(3-methyl-4-hydroxyphenyl)propane; 2, 2-bis(3-fluoro-4-hydroxyphenyl)-propane; 1, 1-bis(4-hydroxyphenyl)butane; 2, 2-bis(4-hydroxyphenyl )butane; 1, 4-bis(4-hydroxyphenyl )butane; 1, 4-bis(4-hydroxyphenyl )butane; 2, 2-bis(4-hydroxyphenyl )pentane; 4-methyl-2, 2-bis(4-hydroxyphenyl )pentane; 2-2-bis(4-hydroxyphenyl )hexane; 4, 4-bis(4-hydroxyphenyl )heptane; 2, 2-bis(4-hydroxyphenyl )nonane; 1, 10-bis(4-hydroxyphenyl )decane; 1, 1-bis(4-hydroxyphenyl)-3, 3, 5-trimethylcyclohexane; and 2, 2-bis(4-hydroxyphenyl)-1, 1, 1, 3, 3, 3-hexafluoropropane, a dihydroxydiarylcycloalkane such as 1, 1-bis(4-hydroxyphenyl)cyclohexane; 1, 1-bis(3, 5-dichloro-4-hydroxyphenyl)cyclohexane; and 1, 1-bis(4-hydroxyphenyl)cyclodecane, a dihydroxydiaryl sulfone such as bis(4-hydroxyphenyl sulfone; bis(3, 5-dimethyl-4-hydroxyphenyl)sulfone; and bis(3-chloro-4-hydroxyphenyl) sulfone, a dihydroxydiaryl ether such as bis(4-hydroxyphenyl) ether; and bis(3, 5-dimethyl-4-hydroxyphenyl) ether, a dihydroxydiaryl ketone such as 4, 4'-dihydroxybenzophenone and 3, 3', 5, 5'-tetramethyl-4, 4'-dihydroxybenzophenone, a dihydroxydiaryl sulfide such as bis(4-hydroxyphenyl) sulfide; bis(3-methyl-4-hydroxyphenyl) sulfide and bis(3, 5-dimethyl-4-hydroxyphenyl) sulfide, a dihydroxydiaryl sulfoxide such as bis(4-hydroxyphenyl) sulfoxide, a dihydroxydiphenyl such as 4, 4'-dihydroxydiphenyl, and a dihydroxyarylfluorene such as 9, 9-bis(4-hydroxyphenyl) fluorene. As a dihydric phenol other than that represented by the general formula (III), mention is made of a dihydroxybenzene such as hydroquinone, resorcinol and methylhydroquinone, and a dihydroxynaphthalene such as 1, 5-dihydroxynaphthalene and 2, 6-dihydroxynaphthalene. The above-mentioned dihydric phenol may be employed alone or in combination with at least one of others.

Examples of the carbonic acid diester compound include a diaryl carbonate such as diphenyl carbonate, and a dialkyl carbonate such as dimethyl carbonate and diethyl carbonate.

Any kind of molecular weight modifier which is generally used in the production of polycarbonate can be employed in the present invention. Examples of the molecular weight modifier include a monohydric phenol such as phenol, p-cresol, p-tert-butylphenol, p-tert-octylphenol, p-cumylphenol, bromophenol, tribromophenol and nonylphenol.

The aromatic polycarbonate to be employed in the present invention may be a mixture of at least two kinds of different aromatic polycarbonates. In view of mechanical strength as well as moldability, the aromatic polycarbonate has a viscosity-average molecular weight in the range of preferably 10,000 to 100,000, particularly preferably 15,000 to 40,000.

In addition, the aromatic polycarbonate as the component (A) may be a copolymer of a polycarbonate and a polyorganosiloxane as the case may be, said polycarbonate having the repeating unit represented by the general formula (IV)

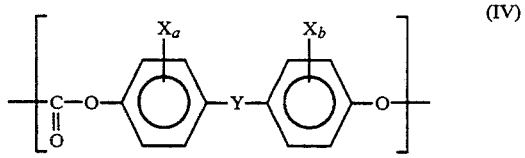

wherein X, Y, a and b are each as previously defined, and said polyorganosiloxane having the repeating unit represented by the general formula (V)

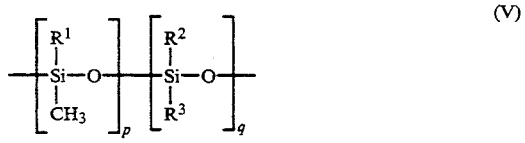

wherein $R^1$, $R^2$ and $R^3$ are each a hydrogen atom, an alkyl group having 1 to 6 carbon atoms such as methyl group, ethyl group, propyl group, n-butyl group, isobutyl group, amyl group, isoamyl group, hexyl group, or phenyl group, and may be the same as or different from each other; and p and q are each an integer of 0 or at least 1. The degree of polymerization of the polyorganosiloxane moiety is preferably 5 or more. The above-mentioned copolymer (hereinafter referred to as "PC-PDMS copolymer") has a viscosity-average molecular weight in the range of preferably 10,000 to 50,000, more preferably 15,000 to 35,000.

The PC-PDMS copolymer can be produced by the steps of dissolving a polycarbonate oligomer prepared in advance which constitutes polycarbonate moiety (PC oligomer) as well as a polyorganosiloxane which has a reactive group at a terminal thereof, constitutes polyorganosiloxane moiety, and is examplified by polydialkylsiloxane such as polydimethylsiloxane (PDMS), polydiethylsiloxane, polymethylphenylsiloxane or the like in a solvent such as methylene chloride, chlorobenzene and chloroform to form a solution; adding aqueous solution of sodium hydroxide with bisphenol A to the resultant solution; and subjecting the mixture to interfacial reaction by the use of triethylamine or trimethylbenzylammonium chloride as a catalyst. There is also usable the polycarbonate/polyorganosiloxane copolymer which is produced by the process described in Japanese Patent Publication Nos. 30108/1969 and 20510/1970.

The PC oligomer having the repeating unit represented by the general formula (IV) can be produced by a solvent process, that is, by the reaction of a dihydric phenol represented by the aforesaid general formula (III) with a carbonate precursor such as phosgen or by the transesterification between such a dihydric phenol and a carbonate precursor such as diphenyl carbonate.

The PC oligomer to be used for the production of the PC-PDMS copolymer may be a homopolymer containing a single dihydric phenol as above or a copolymer containing at least two different dihydric phenols.

The ratio of the polyorganosiloxane represented by the general formula (V) to the total sum of said polyorganosiloxane and the polycarbonate represented by the general formula (IV) is preferably 0.1 to 40% by weight, more preferably 0.5 to 35% by weight. The PC-PDMS copolymer may be contained in the component (A) in a proportion of 10 to 100% by weight.

The aromatic polycarbonate as the component (A) according to the present invention may contain when necessary, a branched polycarbonate (branched PC) in a proportion Of 10 to 90% by weight, preferably 15 to 70% by weight.

Examples of branching agents to be used for producing the aforesaid branched PC include phloroglucine; mellitic acid; trimellitic acid; trimellitic acid chloride; trimellitic anhydride; gallic acid; n-propyl gallate; protocatechuic acid; pyromellitic acid;. pyromellitic dihydride; α-resorcylic acid; β-resorcylic acid; resorcylaldehyde; trimethyl chloride; isatin bis(o-cresol); trimethyl trichloride; 4-chloroformylphthalic anhydride; benzophenonetetracarboxylic acid; 2, 4, 4, -trihydroxybenzophenone; 2, 2', 4, 4'-tetrahydroxybenzophenone; 2, 4, 4'-trihydroxyphenyl ether; 2, 2'4, 4'-tetrahydroxyphenyl ether; 2, 4, 4'-trihydroxydiphenyl-2-propane; 2, 2'-bis(2, 4-dihydroxy)propane; 2, 2'4 4'-tetrahydroxydiphenylmethane; 2, 4, 4'-trihydroxydiphenylmethane; 1-[α-methyl-α-(4'-dihydroxyphenyl)ethyl]-3-[α', α-bis(-4''-hydroxyphenyl)ethyl]benzene; 1-[α-methyl-α-(4'-dihydroxyphenyl)ethyl]-4-[α', α'-bis(4''-hydroxyphenyl)ethyl]benzene; α, α',α''-tris(4-hydroxyphenyl)-1, 3, 5, 5-triisopropylbenze; 2, 6-bis(2-hydroxy-5'-methylbenzyl)-4-methylphenol; 4, 6-dimethyl-2, 4, 6-tris(4'-hydroxyphenyl)-2-heptene; 4, 6-dimethyl-2, 4, 6-tris(4'-hydroxyphenyl)-2-heptane; 1, 3, 5-tris(4'-hydroxyphenyl)benzene; 1, 1, 1-tris(4-hydroxyphenyl)ethane; 2, 2-bis[4, 4-bis(4'-hydroxyphenyl)cyclohexyl]propane; 2, 6-bis(2'-hydroxy-5'-isopropylbenzyl)-4-isopropylhenol; bis[2-hydroxy-3-(2'-hydroxy-5'-methylbenzyl)-5-methylphenyl]methane; bis[2-hydroxy-3-(2'-hydroxy-5'-isopropylbenzyl)-5-methylphenyl]methane; tetrakis(4-hydroxyphenyl)methane; tris(4-hydroxyphenyl)phenylmethane; 2', 4', 7'-trihydroxyflavan; 2, 4, 4'-trimethyl-2', 4', 7'-trihydroxyflavan; 1, 3-bis(2', 4'-dihydroxyphenyl-isopropyl )benzene; and tris(4'-hydroxyaryl)-amyl-s-triazine.

In addition, the aromatic polycarbonate as the component (A) may be a copolymer containing, as a comonomer, such aliphatic straight-chain dibasic carboxylic acid as adipic acid, pimelic acid, suberic acid, azelaic acid, sebacic acid or decanedicarboxylic acid.

There are available a variety of alkali metal salts or alkaline earth metal salts of perfluoroalkanesulfonic acids as the component (B) that constitute the resin composition according to the present invention, of which is preferable the compound represented by the general formula (VI)

wherein n is an integer of 1 to 10, M is an alkali metal such as lithium, sodium, potassium or cesium, or an alkaline earth metal such as magnesium, calcium, strontium or barium, and m is the valency of M. For example, the compounds described in Japanese Patent Publication No. 40445/1972 correspond to the above-mentioned compound.

In the above formula, M is preferably potassium. Examples of suitable perfluoroalkanesulfonic acids include perfluoromethanesulfonic acid, perflouroethanesulfonic acid, perfluoropropanesulfonic acid, perfluorobutanesulfonic acid, perfluoromethylbutanesulfonic acid, perfluorohexanesulfonic acid, perfluoroheptanesulfonic acid and perfluorooctane sulfonic acid. The potassium salt of any of the aforementioned acids is particularly preferable.

There are available a variety of or ganopolysiloxanes each containing organoxysilyl group bonded to a silicon atom through a divalent hydrocarbon group (hereinafter referred to as "Organopolysiloxane") as the component (C) that constitute the resin composition according to the present invention. Specifically, mention is made of a straight-chain, cyclic, network or partially branched straight-chain organopolysiloxane containing organoxysilyl group bonded to a silicon atom through a divalent hydrocarbon group, of which is preferable a straight-chain organopolysiloxane containing an organoxysilyl group bonded to a .silicon atom through a divalent hydrocarbon group.

Examples of the organopolysiloxane containing an organoxysilyl group bonded to a silicon atom through a divalent hydrocarbon group are the straight-chain organopolysiloxanes represented by the general formula (VII):

wherein $R^4$ is a monovalent hydrocarbon group A is a monovalent hydrocarbon group or a monovalent hydrocarbon group having an organoxysilyl group represented by the general formula (VIII):

$$-R^5SiR^6_x(OR^7)_{(3-x)} \quad \text{(VIII)}$$

($R^4$ is a divalent hydrocarbon group, $R^5$ and $R^6$ are, respectively, a monovalent hydrocarbon group and x is an integer of 0 to 2), at least one of A is a monovalent hydrocarbon group containing an organoxysilyl group, c is an integer of 1 to 300, d is an integer of 0 to 300 and c+d is an integer of 1 to 300.

Examples of the monovalent hydrocarbon group shown by $R^4$ in the general formula (VII) are: alkyl groups such as methyl group, ethyl group, propyl group, butyl group, pentyl group, hexyl group; alkenyl groups such as vinyl group, allyl group, butenyl group, pentenyl group, hexenyl group; aryl groups such as phenyl group, tolyl group, xylyl group; aralkyl groups such as benzyl group, phenytyl group; and substituted alkyl groups such as chloromethyl group, chloropropyl group, 3, 3, 3-trifluoropropyl group. Examples of the monovalent hydrocarbon radical shown by A are the same as those described above.

Examples of the divalent hydrocarbon group shown by $R^5$ in the general formula (VIII) are alkylene groups such as methylmethylene group, ethylene group, methylethylene group, propylene group, butylene group. Examples of the monovalent hydrocarbon radical shown by $R^6$ or $R^7$ are the same as those described above. Examples of the monovalent hydrocarbon radical containing an organoxysilyl group are trimethoxysilylethylene group, triethoxysilylethylene group, dimethoxyphenoxysilylpropoylene group, trimethoxysilylpropylene group, trimethoxysilylbutylene group, methyldimethoxysilylpropylene group, dimethylmethoxysilylpropylene group and the like.

Molecular weight of the component (C) is not particularly limited. It is preferred that, in the general formula (VII), c be an integer of 1 to 300, d be an integer of 0 to 300 and c+d be an integer of 1 to 300, so that the decrease in the molecular weight of the polycarbonate resin in the resin composition of the present invention can be suppressed.

Organosiloxane as the component (C) can be obtained by various methods. For example, it can be prepared by addition reaction between an organopolysiloxane having a hydrogen atom bonded to a silicon atom and a hydrocarbon having both and organoxysilyl group and an aliphatic unsaturated hydrocarbon linkage in the presence of a platinum catalyst. It can also be prepared by addition reaction between an organopolysiloxane having a hydrocarbon radical having an aliphatic unsaturated hydrocarbon linkage and an organoxysilane having a hydrogen atom bonded to a silicon atom in the presence of a platinum catalyst.

It is necessary in the resin composition [I] according to the present invention that the components (A), (B) and (C) be blended so that the resin composition comprises 100 parts by weight of the aromatic polycarbonate resin as the component (A); 0.01 to 0.5, preferably 0.03 to 0.5, more preferably 0.1 to 0.3 part by weight of the alkali metal salt or alkaline earth metal salt of the perfluoroalkanesulfonic acid as the component (B); and 0.03 to 5, preferably 0.05 to 2.0, more preferably 0.1 to 0.8 parts by weight of the Organopolysiloxane as the component (C).

An amount of the component (B) less than 0.01 part by weight leads to difficulty in attaining the desired flame retardancy (UL94, V-O), whereas that more than 0.5 part by weight results not only in failure to exert the effect on improving the flame retardancy in proportion to the amount added but also in possible deterioration of physical properties such as impact strength for the polycarbonate resin.

An amount of the component (C) less than 0.03 part by weight brings about failure to sufficiently exhibit the effect on preventing dripping of the resin composition at the time of combustion, whereas that more than 5 parts by weight results not only in failure to exert the effect on preventing dripping of the resin composition at the time of combustion in proportion to the amount added, but also in such disadvantages for the polycarbonate resin that the physical properties such as impact resistance are deteriorated and poor biting of the resin is caused by the slippage thereof on the screws of an injection molding machine at the time of injection molding, thereby making lit impossible to afford an expected molding.

On the other hand, in the resin composition [II] according to the present invention, the aromatic polycarbonate as the component (A) is compounded with an inorganic filler as component (D) along with the above-mentioned components (B) and (C). There are available a variety of inorganic fillers as the component (D), which are used for the purpose of improving the mechanical physical properties and durability of the polycarbonate resin composition or as extender fillers.

Specific examples of the inorganic fillers include potassium titanate whisker, mineral fiber such as rock wool, glass fiber, carbon fiber, metallic fiber such as stainless steel fiber, aluminum borate whisker, silicon nitride whisker, boron fiber, zinc oxide whisker of tetrapod-shap, talc, clay, mica, pearl mica, aluminum foil, alumina, glass flake, glass beads, glass balloon, carbon black, graphite, calcium carbonate, calcium sulfate, calcium silicate, titanium oixde, zinc sulfide, zinc oxide, silica, asbestos, quartz powder and the like.

Any of the above-mentioned inorganic fillers may be used with or without surface treatment in advance. The surface treatment includes physical surface treatment and chemical surface treatment using a surface treatment agent which is exemplified by silane-based coupling agent and surface treatment agent of higher fatty acid, metallic salt of fatty acid, unsaturated organic acid, organic titanate, resin acid, polyethylene glycol or the like.

Of the above-mentioned inorganic fillers, glass fiber as the fibrous fiber which is made of any of alkali-containing glass, low-alkali glass and alkali-free glass as the raw material can preferably be used. The length of the glass fiber is in the range of preferably 0.0 to 2 mm, more preferably 0.05 to 1 mm. Since the glass fiber is sometimes fractured at the time of kneading with the aforesaid polycarbonate resin, it has a length in the range of preferably 1 to 6 mm when subjected to kneading and a diameter in the range of usually 1 to 20 $\mu$m.

The glass fiber is not specifically limited with respect to the form, but may be in any form including rouing, milled fiber and chopped strand. The glass fiber may be used alone or in combination with at least one different kind.

For the purpose of improving the adhesiveness to the polycarbonate resin, it is preferable that the glass fiber be surface-treated with a surface treatment agent and then binding-treated by using a suitable binding agent prior to kneading.

As the surface treatment agent, mention is made of a silane-based coupling agent such as aminosilane-based, epoxysilane-based, vinylsilane-based and acrylsilane-based ones, and titanate-based, aluminum-based, chromium-based, zirconium-based and boron-based coupling agents, of which are suitable a silane-based coupling agent and titanate-based coupling agent, especially silane-based coupling agent.

The method for treating the glass fiber with the above-mentioned surface treatment agent is not specifically limited, but may arbitrarily be selected from the conventional methods, for example, aqueous solution method, organic solvent method and spraying method.

Examples of usable binding agent include urethane-based, acrylic resin-based, acrylonitrile/styrene copolymer-based and epoxy resin-based binding agents. The method for binding treating the glass fiber by using the aforesaid binding agent is not specifically limited, but may arbitrarily be selected from the conventional methods, for example, immersion coating, roller coating, spray coating and flow coating.

The glass flake (amorphous) has a major axis of preferably 2,000 $\mu$m or shorter, more preferably 0.5 to 1,000 $\mu$m and an aspect ratio, that is, the ratio of major axis of the filler to thickness thereof, of preferably 5 or more, more preferably 10 or more. A major axis of a sheet-like filler larger than 2,000 $\mu$m unfavorably causes difficulty in uniform mixing and a fear of forming spot on the molding to be produced. An aspect ratio of a sheet-like filler less than 5 unfavorably brings about insufficiency in lowering anisotropy in dimensional stability of the molding to be produced and in the improvement of heat distortion temperature and also tends to lower the impact strength.

It is preferable that the talc has an average particle size of 0.2 to 15 $\mu$m, especially 0.2 to 10 $\mu$m, and the mica has an average particle size 1 to 250 $\mu$m, especially 2 to 100 $\mu$m.

The process for producing the talc or mica is not specifically limited, but may be in accordance with a process in which raw stone material is ground by the use of a tube mill type grinder, impact grinder, micro mill type grinder or centrifugal roller type Raymond mill, and when required, further fine-ground or pulverized in dry or wet system by means of a micron mill, Jet mill, Jet-O-Mizer, micronizer, jet pulverizer, agitational grinding mill (tower mill), vibratory mill, colloid mill or the like.

Subsequently, the ground or pulverized talc or mica is subjected to dry or wet classification once or plural times repeatedly to regulate the physical properties thereof by using a cyclone separator, multiclone, micron separator, microplex, cyclone air-separator, ultra-separator, jetclone, classiclone, rake classifier, hydrocyclone, hydroulic classifier, centrifugal classifier or the like.

With regard to titanium oxide, any of the rutile type titanium oxide and the anatase type one may be used. However, the futile type titanium oxide is preferable, which excels in thermal stability and weatherability. Titanium oxide is more effectively applied when the surface thereof is treated and coated with a surface treatment agent of any of various kinds, which is exemplified by hydrated alumina, silica and zinc for general use. Moreover, silicone oil, polyol or the like may be incorporated in order to improve the dispersibility of titanium oxide in the resin.

It is necessary in the resin composition[II] according to the present invention that the components (A), (B), (C) and (D) be blended so that the resin composition comprises 100 parts by weight of the aromatic polycarbonate resin as the component (A); 0.01 to 0.5, preferably 0.02 to 0.4part by weight of the alkali metal salt or alkaline earth metal salt of the p erfluoroalkanesulfonic acid as the compnent (B); 0.03 to 5, preferably 0.1 to 1.0 parts by weight of the Organapolysiloxane as the component (C); and 5 to 120, preferably 7 to 110 parts by weight of the inorganic filler as the component (D).

An amount of the component (B) less than 0.01 part by weight leads to difficulty in attaining the desired flame retardancy and to a prolonged combustion time, whereas that more than 0.5 part by weight results not only in failure to exert the effect on improving the flame retardancy in proportion to the amount added but also in possible deterioration of physical properties such as impact strength for the polycarbonate resin.

An amount of the component (C) less than 0.03 part by weight brings about failure to sufficiently exhibit the effect on preventing dripping of the resin composition at the time of combustion, whereas that more than 5 parts by weight results not only in failure to exert the effect on preventing dripping of the resin composition at the time of combustion in proportion to the amount added, but also in such disadvantages for the polycarbonate resin that the physical properties such as impact resistance are deteriorated and poor biting of the resin is caused by the slippage thereof on the screws of an injection molding machine at the time of injection molding, thereby making it impossible to afford an expected molding.

An amount of the component (D) less than 5 parts by weight results in failure to sufficiently exhibit the effect on improving the mechanical physical properties such as rigidity and strength of the resin composition, whereas that more than 120 parts by weight causes such disadvantages as damage to the properties inherent in the polycarbonate resin, deterioration of the appearance of the articles molded therefrom or severe abrasion or wear of the screw of a molding machine during the course of producing molded articles.

In the resin compositions (I) and (II) according to the present invention, any of various kinds of additives, other kinds of synthetic resins or elastomers can be mixed in the resin composition of the present invention according to necessity to the extent that such mixing does not impair the object of the present invention.

Examples of such additives are: antioxidants such as hindered phenols, esters of phosphorous acid, esters of phosphoric acid and amines; ultraviolet absorbents such as benzotriazoles and benzophenones; light stabilizers such as hindered amines; internal lubricants such as aliphatic carboxylic acid esters, paraffin, silicone oil and polyethylene wax; and flame retardants, flame retarding aid, mold release agents, antistatic agents, coloring agents and the like of conventional types.

Examples of the other kinds of synthetic resins include a polyester such as polyethylene terephthalate and polybutylene terephthalate, polyamide, polyethylene, polypropylene, polystyrene, acrylonitrile/styrene resin (AS resin), acrylonitrile/butadiene/styrene resin (ABS resin) and poly(methyl methacrylate).

Examples of the elastomers include isobutylene/isoprene rubber, styrene/butadiene rubber, ethylene/propylene rubber, acrylic elastomer, polyester-based elastomer, polyamide-based elastomer and MBS, MAS, etc. that are core shell type elastomers.

The resin composition (I) according to the present invention can be prepared by compounding the above-mentioned components (A), (B) and (C) and, as necessary, any of the aforesaid additives in respective prescribed proportions and kneading the resultant compound.

The resin composition (II) according to the present invention can be prepared in the same manner as above except that the component (D) should be compounded as an indispensable component together with the components (A), (B) and (C).

The compounding and the keading can be carried out by using any of conventional methods, for example, the method using a ribbon blender, a Henschel mixer, a Banbury mixer, a drum tumbler, a single-screw extruder, a twin-screw extruder, a cokneader, a multi-screw extruder or the like. The temperature during the kneading is usually selected in the range of 240° to 300° C.

The polycarbonate resin composition thus obtained can be molded by any of various kinds of conventional methods of molding such as injection molding, blow molding, extrusion molding, compression molding, calender molding, rotation molding and the like to provide various kinds of molded articles typified by those in the field of electrical home appliances.

By virtue of blending an aromatic polycarbonate resin with an alkali metal salt or an alkaline earth metal salt of a perfluoroalkanesulfonic acid, a specifically reactive polyorganosiloxane and, as the case may be, an inorganic filler in respective prescribed proportions, the flame retardative polycarbonate resin composition according to the present invention is provided with excellent flame retardancy capable of preventing dripping thereof at the time of combustion of a thin-walled material made from the composition highly fluidized, while precluding the deterioration of the mechanical properties such as impact resistance as well as dimensional stability that are inherent in polycarbonate.

Accordingly, the polycarbonate resin composition of the present invention can be utilized for producing a variety of molded articles typified by those in the field of office automation machinery, and electric and electronic machinery that are required to be flame retardative.

In the following, the present invention will be described in more detail with reference to comparative examples and examples, which however shall not be construed to limit the invention thereto.

Each of the raw materials used in the examples and comparative example as the component (A), (B), (C) or (D) will be described in detail in the following.
(A) Aromatic polycarbonate resin
(1) Polycarbonate resin (pc)
 $A_1$: Toughlon A2200 [a product of Idemitsu Petrochemical Co., Ltd.; $M_v=22200$]
 $A_2$: Toughlon A1900 [a product of Idemitsu Petrochemical Co., Ltd.; $M_v=19000$]
 $A_3$: Toughlon A1700 [a product of Idemitsu Petrochemical Co., Ltd.; $M_v=18000$]
(2) PC-PDMS copolymer [Preparation Example 1-3]
(3) Branched polycarbonate Toughlon IB2500 [a product of Idemitsu Petrochemical Co., Ltd.]
(B) Alkali salt of perfluorobutanesulfonic acid Megafac F114 [a product of Dainippon Ink and Chemicals, Inc.; potassium salt of perfluorobutanesulfonic acid]
(C) Organopolysiloxane
 $C_1$: produced in Preparation Example 2. content of methyoxy group; 21.4 weight %, Kinematic viscosity; 20 cSt at 25° C.
 $C_2$: produced in Preparation Example 3. content of methyoxy group; 12.7 weight %, Kinematic viscosity; 15 cSt at 25° C.
 $C_3$: dimethylsiloxane, SH200 [a product of Dow Corning Toray Silicone Co., Ltd.]
(D) Inorganic filler
 $D_1$: chopped strand glass fiber [a product of Asahi Fiber Glass Co., Ltd. 03MA 409C]
 $D_2$: talc. FFR [a product of Asada Milling Co., Ltd.]
 $D_3$: mica, M-325 [a product of Repco Co., Ltd.]
 $D_4$: titanium oxide CR-60 [a product of Ishihara Sangyo, Kaisha, Ltd.]
Preparation Example 1—1

[Preparation of a polycarbonate oligomer (a PC oligomer)]

In 400 liter of 5% by weight aqueous solution of sodium hydroxide, 60 kg of bisphenol A was dissolved to prepare an aqueous sodium hydroxide solution of bisphenol A. Through a tubular reactor having 10 millimeters inner diameter and 10 meters length, the aqueous sodium hydroxide solution of bisphenol A prepared above and kept at room temperature and methylene chloride were passed at a flow rate of 138 liter/hr and 69 liter/hr, respectively, via an orifice plate. In parallel with these streams, phosgen was passed through the reactor at a flow rate of 10.7 kg/hr. The reaction was kept for 3 hours continuously. The tubular reactor had the structure of double tubes and cooling water was passed through the jacket part to keep the discharge temperature of the reaction solution at 25° C. The pH value of the discharged solution was controlled in the range of 10 to 11. The reaction solution thus obtained was left standing. Then, the separated water phase was removed and the methylene chloride phase (220 liter) was collected. Methylene chloride was removed by evaporation to obtain a PC oligomer in the form of flake. Degree of polymerization of the resultant PC oligomer was 3 to 4.

Preparation Example 1-2

[Synthesis of a reactive polydimethylsiloxane (PDMS)]

Octamethylcyclotetrasiloxane in an amount of 1483 g, 18.1 g of 1, 1, 3, 3-tetramethyldisiloxane and 35 g of 86 % by weight sulfuric acid were mixed together and the mixture was stirred for 17 hours at room temperature. Then, the oil phase was separated and 25 g of sodium hydrogen carbonate was added to the separated oil phase. The mixture was stirred for 1 hour. After filtration, the reaction solution was distilled under a vacuum of 3 torr at 150° C. to remove low boiling point components.

To a mixture of 60 g of 2-allylphenol and 0.0014 g of platinum in the form of a complex compound of platinum chloride and an alcoholate, 294 g of the oily product obtained above was added at a temperature of 90° C. The mixture was stirred for 3 hours while it was kept at a temperature of 90° to 115° C. The reaction product was extracted with methylene chloride and the extract was washed with an 80 % by weight aqueous methanol 3 times to remove excess amount of 2-allylphenol. The product was dried with anhydrous sodium sulfate and then the solvent was removed under vacuum by heating up to a temperature of 115° C.

The PDMS terminated with phenol was found to have 150 repeating units of dimethylsilanoxy group by NMR measurement.

Preparation Example 1-3

[Preparation of a polycarbonatepolydimethylsiloxane (PC-PDMS) copolymer]

The reactive PDMS obtained in Preparation Example 1-2 in an amount of 185 g was dissolved into 2 liter of methylene chloride and the solution was mixed with 10 liter of the PC oligomer obtained in Preparation Example 1-1. To this solution, a solution prepared by dissolving 26 g of sodium hydroxide in 1 liter of water and 5.7 cc of triethylamine were added and the mixture was kept stirring for 1 hour at room temperature at 500 rpm. Then, a solution prepared by dissolving 600 g of bisphenol A in 5 liter of a 5.2 weight % aqueous sodium hydroxide solution, 8 liter of methylene chlooride and 81 g of p-tert-butylphenol were added and the mixture was kept stirring for 2 hours at room temperature at 500 rpm. After the stirring, 5 liter of methylene chloride was added and the solution was washed with water by using 5 liter of water, with an alkali by using 5 liter of a 0.01N aqueous sodium hydroxide solution, with an acid by using 5 liter of 0.1N aqueous solution of hydrochloric acid and with water by using 5 liter of water, successively. Finally, methylene chloride was removed to afford a PC-PDMS copolymer of chip form.

The PC-PDMS copolymer thus obtained had $M_v$ (viscosity-average molecular weight) of 20,000, a chain length of PDMS (dimethylsilanoxy unit) of 150 and a content of PDMS of 4% by weight.

Measurements of the viscosity-average molecular weight ($M_v$), the chain length of PDMS (dimethylsilanoxy unit) and the content of PDMS were conducted according to the following methods:

1) Viscosity-average molecular at weight ($M_v$)

A molded product was pulverized and dissolved into methylene chloride. The insoluble fraction was removed by filtration and a film was formed from the solution by evaporation of the solvent. The film formed was dissolved in methylene chloride again and viscosity of the solution thus obtained was measured by using an Ubelhode viscometer at 20° C. to obtain intrinsic viscosity $[\eta]$. Viscosity-average molecular weight was obtained from the intrinsic viscosity by the following equation:

$$[\eta] = 1.23 \times 10^{-5} M_v^{0.83}$$

2) Chain length of PDMS (number of dimethylsilanoxy unit)

Chain length of PDMS was obtained from the ratio of the peak of methyl group of dimethylsiloxane observed at 0.2 ppm and the peak of methylene group of PC-PDMS linkage part observed at 2.6 ppm in $^1$H-NMR.

3) Content of PDMS

Content of PDMS was obtained from the ratio of the peak of methyl group in isopropyl group of bisphenol A observed at 1.7 ppm and the peak of methyl group of dimethylsiloxane observed at 0.2 ppm in $^1$H-NMR.

Preparation Example 2

[Preparation of polydimethylsiloxane having an alkoxysilyl group in the side chain of the molecule]

To a 1 liter round bottom flask equipped with a stirrer, a reflux condenser and a thermometer, 151 g of hexamethyldisiloxane, 482 g of octamethylcyclotetrasiloxane, 167 g of tet ramethylcyclotetrasiloxane and 3.0 g of active clay were fed and heated by using a mantle heater at 60° C. for 8 hours under stirring. After the mixture was allowed to cool it was filtered to afford 760 g of a colorless transparent oily product.

Structure of the oily product thus obtained was determined as follows by NMR measurement:

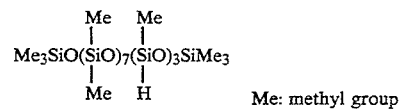

Me: methyl group

Then, into a 500 milliliter round bottom flask equipped with a stirrer, a reflux condenser and a thermometer, 247 g of the oily product obtained above, 153 g of vinyltrimethoxysilane and 0.15 g of a 3% by weight alcohol solution of a chloroplatinic acid were fed and heated by using a mantle heater at 80° C. for 4 hours under stirring. The excess amount of vinyltrimethoxysilane was removed from the reaction product by distillation at 120° C. under a vacuum of 30 mm Hg. The residual part was filtered and 363 g of a light brown transparent oily product was obtained.

Structure of the oily product thus obtained was determined as follows by NMR measurement:

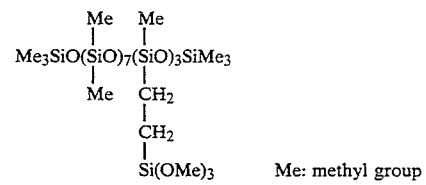

Me: methyl group

The product had a methoxy group content of 21.4% by weight and a kinematic viscosity at 25° C. of 20 cSt.

Preparation Example 3

[Preparation of polydimethylsiloxane having an alkoxysilyl group at the both ends of the molecule]

To a 1 liter round bottom flask equipped with a stirrer, a reflux condenser and a thermometer, 92 g of tetramethyldisiloxane, 708 g of octamethylcyclotetrasiloxane and 3.0 g of active clay were fed and heated by using a mantle heater at 60° C. for 8 hours under stirring. After the mixgture was allowed to cool, it was filtered to afford 760 g of a colorless transparent oily product.

Structure of the oily product thus obtained was determined as follows by NMR measurement:

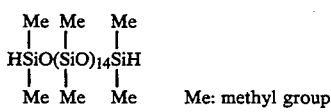

Me: methyl group

Then, into a 500 milliliter round bottom flask equipped with a stirrer, a reflux condenser and a thermomenter, 307 g of the oily product obtained above, 73 g of vinyltrimethoxysilane and 0.15 g of a 3% by weight alcohol solution of a chloroplatinic acid were fed and heated by using a mantle heater at 80° C. for 4 hours under stirring. The excess amount of vinyltrimethoxysilane was removed from the reaction product by distillation at 120° C. under a vacuum of 30 mm Hg. The residual part was filtered and 365 g of a light brown transparent oily product was obtained.

Structure of the oily product thus obtained was determined as follows by NMR measurement

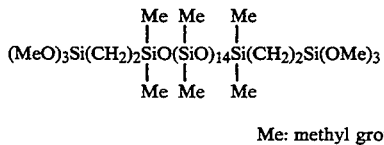

Me: methyl group

The product had a methoxy group content of 12.7% by weight and a kinematic viscosity at 25° C. of 15 cSt.

EXAMPLES 1 to 4 AND COMPARATIVE EXAMPLES 1 to 5

The aromatic polycarbonate resin, potassium salt of perfluorobutanesulfonic acid and organopolysiloxane whose kinds and amounts are given in Table 1 were dried, dry blended and kneaded at 280° C. by the use of an extruder to prepare pellets.

The pellets thus obtained were dried at 120° C. for 12 hours and injection molded at a molding temperature of 280° C. and a mold temperature of 80° C. to prepare test pieces.

Measurements were made of oxygen index, melt flow rate and flame retardance to evaluate the quality of the test pieces that were obtained per each of the examples and comparative examples. The results are given in Table 2.

TABLE 1

| | Composition of Compound (parts by weight) | | | | | |
|---|---|---|---|---|---|---|
| | (A) | | B | (C) | | |
| | PC | branched PC | F114 | organopoly- siloxane | | |
| | kind | amount | amount | amount | kind | amount |
| Example 1 | $A_1$ | 100 | — | 0.15 | $C_1$ | 0.3 |
| Example 2 | $A_2$ | 80 | 20 | 0.1 | $C_1$ | 0.2 |
| Example 3 | $A_2$ | 60 | 40 | 0.05 | $C_1$ | 0.1 |
| Example 4 | $A_2$ | 90 | 10 | 0.2 | $C_1$ | 0.5 |
| Comparative Example 1 | $A_1$ | 100 | — | 0.15 | — | — |
| Comparative Example 2 | $A_1$ | 100 | — | 0.15 | $C_3$ | 0.3 |
| Comparative Example 3 | $A_2$ | 80 | 20 | 0.1 | — | — |
| Comparative Example 4 | $A_2$ | 80 | 20 | — | $C_1$ | 0.5 |
| Comparative Example 5 | $A_2$ | 60 | 40 | 0.1 | $C_3$ | 0.5 |

TABLE 2

| | Oxygen index | Flame retardance 1/12 inch | Flame retardance 1/16 inch | Number of drips per 5 times tests | Melt flow rate |
|---|---|---|---|---|---|
| Example 1 | 36 | V-0 | — | 0 | $6.0 \times 10^{-2}$ |
| Example 2 | 35 | — | V-0 | 0 | $8.5 \times 10^{-2}$ |
| Example 3 | 34 | — | V-0 | 0 | $6.2 \times 10^{-2}$ |
| Example 4 | 37 | — | V-0 | 0 | $10.5 \times 10^{-2}$ |
| Comparative Example 1 | 36 | V-2 | — | 3 | $5.7 \times 10^{-2}$ |
| Comparative Example 2 | 36 | V-2 | — | 2 | $6.3 \times 10^{-2}$ |
| Comparative Example 3 | 35 | — | V-2 | 3 | $8.0 \times 10^{-2}$ |
| Comparative Example 4 | 28 | — | V-2 | 5 | $8.5 \times 10^{-2}$ |
| Comparative Example 5 | 35 | — | V-2 | 5 | $6.4 \times 10^{-2}$ |

(1) Oxygen index: According to Japanese Industrial Standard K 7201

(2) Flame retardance:
According to UL 94 standard (1/12 inch, 1/16 inch thickness), Underwriters Laboratory, Subject 94, vertical flame test was carried out.

(3) Melt flow rate: According to Japanese Industrial Standard K 7210. Measurement was made at the temperature of 280° C. under the load of 160 kg.

EXAMPLES 5 to 14 AND COMPARATIVE EXAMPLES 6 to 9

The aromatic polycarbonate resin, potassium salt of perfluorobutanesulfonic acid, organopolysiloxane and inorganic filler whose kinds and amounts are given in Table, 3 were dried, dry blended and kneaded at 280° C. to 300° C. by the use of a twin-screw vented extruder (produced by Toshiba Machine Co., Ltd. Model: IEM-35) by means of top feeding with an exception of side feeding of glass fiber when used as an inorganic filler to prepare pallets.

The pellets thus obtained were dried at 120° C. for 6 hours and injection molded at a molding temperature of 280° C. to prepare test pieces by the use of an injection moding machine (produced by Toshiba Machine Co., Ltd. Model: IS 25EP).

Measurements were made of flame retardance according to UL94 to evaluate the quality of the test pieces that were obtained per each of the examples and comparative examples. The results are given in Table 4.

TABLE 3

| | (A) | | | (B) | (C) Organopoly-siloxane | | (D) Inorganic filler | |
|---|---|---|---|---|---|---|---|---|
| | PC | PC-PDMS | branched PC | F114 | | | | |
| | kind | amount | amount | amount | amount | kind | amount | kind | amount |
| Example 5 | $A_1$ | 100 | — | — | 0.05 | $C_1$ | 0.4 | $D_1$ | 10 |
| Example 6 | $A_1$ | 100 | — | — | 0.05 | $C_1$ | 0.4 | $D_1$ | 40 |
| Example 7 | $A_3$ | 100 | — | — | 0.05 | $C_1$ | 0.4 | $D_1$ | 40 |
| Example 8 | $A_1$ | 100 | — | — | 0.05 | $C_2$ | 0.4 | $D_1$ | 10 |
| Example 9 | $A_1$ | 100 | — | — | 0.10 | $C_1$ | 0.5 | $D_2$ | 40 |
| Example 10 | $A_1$ | 100 | — | — | 0.10 | $C_1$ | 0.5 | $D_3$ | 40 |
| Example 11 | $A_1$ | 40 | 60 | — | 0.05 | $C_1$ | 0.4 | $D_1$ | 40 |
| Example 12 | $A_1$ | — | 100 | — | 0.05 | $C_1$ | 0.4 | $D_1$ | 40 |
| Example 13 | $A_1$ | 70 | — | 30 | 0.30 | $C_1$ | 0.5 | $D_4$ | 10 |
| Example 14 | $A_2$ | 100 | — | — | 0.05 | $C_1$ | 0.4 | $D_1$ | 40 |
| Comparative Ex. 6 | $A_1$ | 100 | — | — | 0.05 | — | — | $D_1$ | 40 |
| Comparative Ex. 7 | $A_1$ | 100 | — | — | 0.05 | $C_3$ | 0.4 | $D_1$ | 40 |
| Comparative Ex. 8 | $A_1$ | 100 | — | — | 0.05 | $C_1$ | 0.01 | $D_1$ | 40 |
| Comparative Ex. 9 | $A_1$ | 100 | — | — | 0.005 | $C_1$ | 0.4 | $D_1$ | 40 |

TABLE 4

| | Flame retardance 1/16 inch thickness | |
|---|---|---|
| | Judgement | Total combustion time |
| Example 5 | V-0 | 39 |
| Example 6 | V-0 | 30 |
| Example 7 | V-0 | 37 |
| Example 8 | V-0 | 41 |
| Example 9 | V-0 | 46 |
| Example 10 | V-0 | 47 |
| Example 11 | V-0 | 30 |
| Example 12 | V-0 | 32 |
| Example 13 | V-0 | 35 |
| Example 14 | V-0 | 35 |
| Comparative Ex. 6 | V-1 | 95 |
| Comparative Ex. 7 | V-1 | 90 |
| Comparative Ex. 8 | V-1 | 84 |
| Comparative Ex. 9 | V-1 | 85 |

What is claimed is:

1. A flame retardative polycarbonate resin composition which comprises 100 parts by weight of an aromatic polycarbonate resin (A), 0.01 to 0.5 part by weight of at least one metal salt selected from the group consisting of an alkali metal salt of a perfluoro-alkanesulfonic acid and an alkaline earth metal salt of a perfluoroalkanesulfonic acid (B), and 0.03 to 5 parts by weight of an organopolysiloxane containing organoxysilyl group bonded to a silicon atom through a divalent hydrocarbon group (C), said metal salt and said organopolysiloxane being compounded into said polycarbonate resin, wherein the organopolysiloxane containing organoxysilyl group is an organopolysiloxane represented by the general formula (VII)

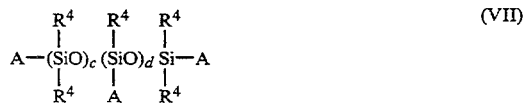
(VII)

wherein $R^4$ is a monovalent hydrocarbon group, A is a monovalent hydrocarbon group or a monovalent hydrocarbon group containing an organoxysilyl group represented by the general formula (VIII)

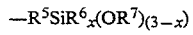
(VIII)

wherein $R^5$ is a divalent hydrocarbon group, $R^6$ and $R^7$ are, respectively, a monovalent hydrocarbon group and x is an integer of 0 to 2, at least one of A is a monovalent hydrocarbon group containing said organoxysilyl group, c is an integer of 1 to 300, d is an integer of 0 to 300, and c+d is an integer of 1 to 300.

2. The composition according to claim 1 wherein the aromatic polycarbonate resin as the component (A) is made from bisphenol A as a starting raw material.

3. The composition according to claim 1 wherein the aromatic polycarbonate resin as the component (A) contains 10 to 100% by weight of a copolymer of an aromatic polycarbonate and a polyorganosiloxane based on the total amount of the component (A).

4. The composition according to claim 1 wherein the aromatic polycarbonate resin as the component (A) contains 10 to 90% by weight of a branched polycarbonate based on the total amount of the component (A).

5. The composition according to claim 1 wherein the component (B) is a potassium perfluoroalkane sulfonate.

6. The composition according to claim 1 wherein the composition comprises 100 parts by weight of the component (A), 0.03 to 0.5 part by weight of the component (B) and 0.05 to 2.0 parts by weight of the component (C).

7. A flame retardative polycarbonate resin composition which comprises 100 parts by weight of an aromatic polycarbonate resin (A), 0.01 to 0.5 part by weight of at least one metal salt selected from the group consisting of an alkali metal salt of a perfluoroalkanesulfonic acid and an alkaline earth metal salt of a perfluoroalkanesulfonic acid (B), and 0.03 to 5 parts by weight of an organopolysiloxane containing organoxysilyl group bonded to a silicon atom through a divalent hydrocarbon group (C) and 5 to 120 parts by weight of an inorganic filler (D), said metal salt, said organopolysiloxane and said filler being compounded into said polycarbonate resin, wherein the organopolysiloxane containing organoxysilyl group is an organopolysiloxane represented by the general formula (VII)

(VII)

wherein $R^4$ is a monovalent hydrocarbon group, A is a monovalent hydrocarbon group or a monovalent hydrocarbon group containing an organoxysilyl group represented by the general formula (VIII)

$$-R^5SiR^6{}_x(OR^7)_{(3-x)} \qquad (VIII)$$

wherein $R^5$ is a divalent hydrocarbon group, $R^6$ and $R^7$ are each a monovalent hydrocarbon group and x is an integer of 0 to 2, at least one of A is a monovalent hydrocarbon group containing said organoxysilyl group, c is an integer of 1 to 300, d is an integer of 0 to 300, and c+d is an integer of 1 to 300.

8. The composition according to claim 7 wherein the aromatic polycarbonate resin as the component (A) is made from bisphenol A as a starting raw material.

9. The composition according to claim 7 wherein the aromatic polycarbonate resin as the component (A) contains 10 to 100% by weight of a copolymer of an aromatic polycarbonate and a polyorganosiloxane based on the total amount of the component (A).

10. The composition according to claim 7 wherein the aromatic polycarbonate resin as the component (A) contains 10 to 90% by weight of a branched polycarbonate based on the total amount of the component (A).

11. The composition according to claim 7 wherein the component (B) is a potassium perfluoroalkane sulfonate.

12. The composition according to claim 7 wherein the composition comprises 100 parts by weight of the component (A), 0.02 to 0.4 part by weight of the component (B), 0.1 to 1 part by weight of the component (C) and 7 to 110 parts by weight of the component (D).

* * * * *